(12) United States Patent  
Ramkumar et al.

(10) Patent No.: US 11,500,827 B2
(45) Date of Patent: *Nov. 15, 2022

(54) SYSTEMS AND METHODS FOR DATA ENTRY

(71) Applicant: Palantir Technologies Inc., Palo Alto, CA (US)

(72) Inventors: Adhish Ramkumar, Plano, TX (US); Kushal Nigam, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/087,569

(22) Filed: Nov. 2, 2020

(65) Prior Publication Data

US 2021/0049135 A1 Feb. 18, 2021

Related U.S. Application Data

(63) Continuation of application No. 15/877,169, filed on Jan. 22, 2018, now Pat. No. 10,824,604.
(Continued)

(51) Int. Cl.
*G06F 16/21* (2019.01)
*G06F 3/06* (2006.01)
(Continued)

(52) U.S. Cl.
CPC .......... *G06F 16/211* (2019.01); *G06F 3/0629* (2013.01); *G06F 16/22* (2019.01);
(Continued)

(58) Field of Classification Search
USPC .................................................. 707/790, 803
See application file for complete search history.

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 A1 | 9/2014 |
| EP | 1647908 A2 | 4/2006 |

(Continued)

OTHER PUBLICATIONS

"A Quick Guide to UniProtKB Swiss-Prot & TrEMBL," Sep. 2011, pp. 2.

(Continued)

*Primary Examiner* — Hung T Vy
(74) *Attorney, Agent, or Firm* — Sheppard Mullin Richter & Hampton LLP

(57) ABSTRACT

Systems and methods for entering and storing data. User input defining a data set is received. A data collection construct including a data entry user interface for inputting data in the data set is defined using the user input. A data storage construct including queries for retrieving the data is automatically defined based on the user input. Additional user input indicating modifications to the data set is received. The data collection construct, the data storage construct, and the queries are automatically updated based on the additional user input indicating modifications to the data set.

14 Claims, 6 Drawing Sheets

Related U.S. Application Data

(60) Provisional application No. 62/507,693, filed on May 17, 2017.

(51) Int. Cl.
*G06F 16/22* (2019.01)
*G06F 16/25* (2019.01)
*G06F 16/242* (2019.01)
*G06F 16/2457* (2019.01)

(52) U.S. Cl.
CPC ...... *G06F 16/2448* (2019.01); *G06F 16/2457* (2019.01); *G06F 16/25* (2019.01)

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Zbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bigham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez, Jr. et al. | |
| 7,028,223 B1 | 4/2006 | Kolawa et al. | |
| 7,085,890 B2 | 8/2006 | Kashyap | |
| 7,100,147 B2 | 8/2006 | Miller et al. | |
| 7,155,728 B1 | 12/2006 | Prabhu et al. | |
| 7,165,101 B2 | 1/2007 | Daniels et al. | |
| 7,216,133 B2 | 5/2007 | Wu et al. | |
| 7,299,202 B2 | 11/2007 | Swanson | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B1 | 1/2012 | Embley et al. | |
| 8,417,715 B1 * | 4/2013 | Bruckhaus | G06Q 10/04 705/26.1 |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing et al. | |
| 8,612,922 B2 * | 12/2013 | Arsintescu | G06F 30/30 716/108 |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,292,388 B2 | 3/2016 | Fisher et al. | |
| 9,330,120 B2 | 5/2016 | Downing et al. | |
| 9,348,677 B2 | 5/2016 | Marinelli, III et al. | |
| 9,378,526 B2 | 6/2016 | Sampson | |
| 2003/0023620 A1 | 1/2003 | Trotta | |
| 2003/0212670 A1 | 11/2003 | Yalamanchi et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2004/0254658 A1 | 12/2004 | Sherriff et al. | |
| 2004/0260702 A1 | 12/2004 | Cragun et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271838 A1 | 11/2006 | Carro | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0150627 A1 * | 6/2009 | Benhase | G06F 11/2082 711/E12.001 |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin et al. | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |

(56) References Cited

U.S. PATENT DOCUMENTS

| | | |
|---|---|---|
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0161542 A1* | 6/2015 | Ashtiani .......... G06Q 10/06313 705/7.23 |
| 2015/0269030 A1 | 9/2015 | Fisher et al. |
| 2016/0026923 A1 | 1/2016 | Erenrich et al. |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| GB | 2366498 A | 3/2002 |
| GB | 2508293 A | 5/2014 |
| GB | 2508503 A | 6/2014 |
| HK | 1194178 A1 | 10/2014 |
| NZ | 622485 A | 11/2014 |
| NZ | 616212 A | 1/2015 |
| NZ | 616299 A | 4/2015 |
| WO | 0034895 A1 | 6/2000 |
| WO | 2010030917 A2 | 3/2010 |
| WO | 2013030595 A1 | 3/2013 |

OTHER PUBLICATIONS

"A Tour of Pinboard," <http://pinboard.in/tour> as printed May 15, 2014 in 6 pages.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.h- tml.

"The FASTA Program Package," fasta-36.3.4, Mar. 25, 2011, pp. 29.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb- /843147 printed Dec. 18, 2006 in 5 pages.

Bae et al., "Partitioning Algorithms for the Computation of Average Iceberg Queries," DaWaK2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Frantisek et al., "An Architectural View of Distributed Objects and Components in CORBA, Java RMI and COM/DCOM," Software-Concepts & Tools, vol. 19, No. 1, Jun. 1, 1998, pp. 14-28.

Goldstein et al., "Stacks Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Ivanova et al., "An Architecture for Recycling Intermediates in a Column Store," Proceedings of the 35th Sigmod International Conference on Management of Data, Sigmod '09, Jun. 29, 2009, p. 309.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expressio- n-parser-with-plug-ins>.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: An Open RDF Infrastructure for Shared Web Annotations", Computer Networks, Elsevier Science Publishers B.V., vol. 39, No. 5, dated Aug. 5, 2002, pp. 589-608.

Karp et al., "A Simple Algorithm for Finding Frequent Elements in Streams and Bags," ACM Transactions on Database Systems, vol. 28, No. 1, Mar. 2003, pp. 5155.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, Tom, "Chapter 16: The BLAST Sequence Analysis Tool," The NCBI Handbook, Oct. 2002, pp. 1-15.

Mendes et al., "TcruziKB: Enabling Complex Queries for Genomic Data Exploration," IEEE International Conference on Semantic Computing, Aug. 2008, pp. 432-439.

Mizrachi, Ilene, "Chapter 1: GenBank: The Nuckeotide Sequence Database," The NCBI Handbook, Oct. 2002, pp. 1-14.

Russell et al., "NITELIGHT: A Graphical Tool for Semantic Query Construction," 2008, pp. 10.

Sigrist, et al., "PROSITE, a Protein Domain Database for Functional Characterization and Annotation," Nucleic Acids Research, 2010, vol. 38, pp. D161-D166.

(56) References Cited

OTHER PUBLICATIONS

Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),EAcitrezza, Catania, Italy, Sep. E29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.

\* cited by examiner

SYSTEMS AND METHODS FOR DATA ENTRY

CROSS REFERENCE TO RELATED APPLICATIONS

This application is a continuation of U.S. patent application Ser. No. 15/877,169, filed Jan. 22, 2018, which claims the benefit under 35 U.S.C. § 119(e) of United States Provisional Application Ser. No. 62/507,693 filed May 17, 2017, the content of which is incorporated by reference in its entirety into the present disclosure.

FIELD OF THE INVENTION

This disclosure relates to systems and methods for entering data, managing data, tracking data based on user input, retrieving data, and/or modification of data.

BACKGROUND

Under conventional approaches, a platform for entering data is provided. Through platforms provided under conventional approaches, a user has to manually define each data collection construct for use in collecting data regardless of whether each data collection construct shares commonalities or are otherwise related. Specifically, under conventional approaches a user has to manually define an entire data collection construct without sharing code commonalities with other data collection constructs associated with the data collection construct. Additionally, through platforms provided under conventional approaches, a user has to manually define each data storage construct for storing data collected through a data collection construct regardless of whether each data storage construct shares commonalities or are otherwise related. Specifically, under conventional approaches a user has to manually define an entire data storage construct without sharing code commonalities with other data storage constructs associated with the data storage construct. Additionally, when data storage constructs, platforms, or data collection constructs change, a user must manually redefine the other facets of the system. For example, when the storage construct changes, the user has to manually redefine the associated platform and the data collection construct.

SUMMARY

Various embodiments of the present disclosure can include systems, methods, and non-transitory computer readable media configured to obtain one or more source code files that correspond to a software program. User input defining a data set can be received. The user input may also include dependencies of the user defined data set (e.g., defining one or more behaviors of associated user interfaces). A data collection construct including a data entry user interface for inputting data in the data set can be defined using the user input. A data storage construct including queries for retrieving the data can be automatically defined based on the user input. Additional user input indicating modifications to the data set can be received. The data collection construct, the data storage construct, and the queries can be automatically updated based on the additional user input indicating modifications to the data set.

In some embodiments, the systems, methods, and non-transitory computer readable media can be configured to define one or more validation constraints based on the user input. Data in a data set can be automatically validated automatically at a data entry user interface as the data is input into the data entry user interface of a data collection construct based on the one or more data validation constraints to determine if the data is valid. An invalidity notification can be presented to a user through the data entry user interface indicating the data is invalid if it is determined the data is invalid.

In some embodiments, the systems, methods, and non-transitory computer readable media can be configured to select a portion of the data in a data set entered through a data collection construct to transfer to a repository (e.g., a central repository and/or non-central repository). The portion of the data in the data set stored according to a data storage construct can be transferred to the repository. The data in the data selected for transfer to the repository can be selected based on a size of the portion of the data in the data set.

In some embodiments, the systems, methods, and non-transitory computer readable media can be configured to define a data storage construct based on the user input for defining the data collection construct while refraining from querying the user for further input for defining the data storage construct.

In some embodiments, the systems, methods, and non-transitory computer readable media can be configured to define a data collection construct using a previously defined data collection construct.

In some embodiments, the systems, methods, and non-transitory computer readable media can be configured to define a data storage construct using a previously defined data storage construct.

In some embodiments, the systems, methods, and non-transitory computer readable media can be configured to automatically define a data storage construct and queries for use in retrieving data stored using the data storage construct based on the data collection construct using data storage construct definition rules.

In some embodiments, the systems, methods, and non-transitory computer readable media can be configured to group a data collection construct with an already defined data collection construct.

In some embodiments, the systems, methods, and non-transitory computer readable media can be configured to define a data collection construct including a data entry user interface to include a form to collect data in a data set through according to user input indicating the form to collect the data through.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
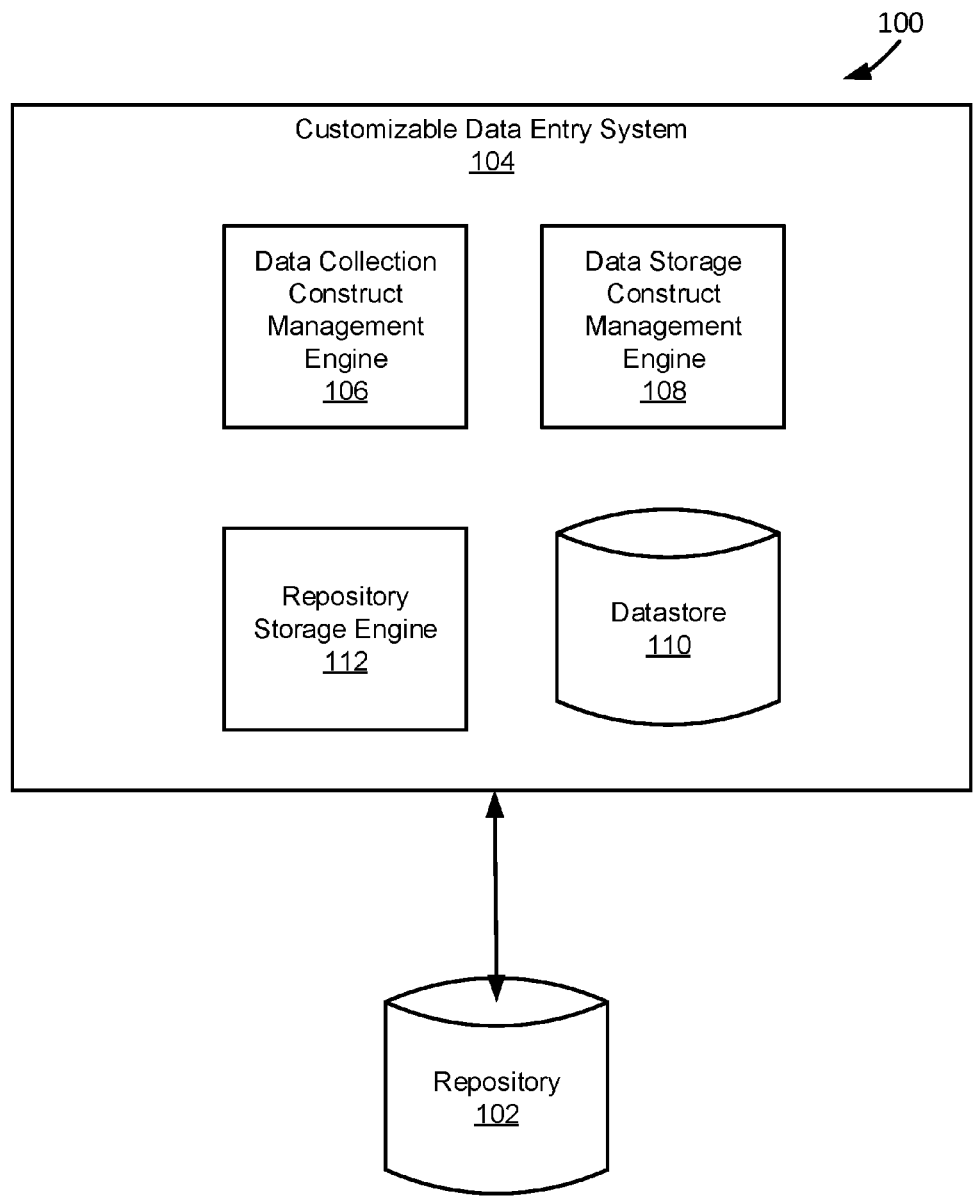
FIG. 1 illustrates an example environment for entering data, in accordance with various embodiments.

Under conventional approaches, a platform for entering data is provided. Through platforms provided under conventional approaches, a user has to manually define each data collection construct for use in collecting data regardless of whether each data collection construct shares commonalities or are otherwise related. Specifically, under conventional approaches a user has to manually define an entire data collection construct without sharing code commonalities with other data collection constructs associated with the data collection construct. Additionally, through platforms provided under conventional approaches, a user has to manually define each data storage construct for storing data collected through a data collection construct regardless of whether each data storage construct shares commonalities or are otherwise related. Specifically, under conventional approaches a user has to manually define an entire data storage construct without sharing code commonalities with other data storage constructs associated with the data storage construct.

A claimed solution rooted in computer technology overcomes problems specifically arising in the realm of computer technology. In various embodiments, a user can provide user input for defining a data set. User input provided by a user defining a data set can be used in collecting data for the data set. In certain embodiments, a data collection construct can be defined for collecting data in the data set based on the user input. The user input can be used to generate and/or update a data entry user interface based on the user input for purposes of collecting data in the data set based on the user input. For example, the data entry user interface can be automatically generated and/or updated when the user defines the data set. The data entry user interface can be compatible with different types of front end systems. In various embodiments, a data storage construct for storing data in a datastore of the data set input through the data entry user interface of the data collection construct is automatically defined based on the user input. A data storage construct can be defined by automatically defining table schema (and/or other schema) and index mappings for retrieving data of the data set input through the data entry user interface according to the data collection construct and stored in the datastore. In some embodiments, the data storage construct does not define and/or otherwise enforce any schema (e.g., if the datastore lacks a schema or is a blob store). For example, the data entry user interface can validate the user input and provide feedback directly to the user. Further, the data storage construct can be defined based on the user input while refraining from querying the user for additional input for defining the data storage construct. In various embodiments, queries for use in retrieving the data in the data set input through the data entry user interface and stored in the datastore using the data storage construct are automatically defined. Queries for use in retrieving the data in the data set input through the data entry user interface and stored in the datastore can be automatically defined as part of defining the data storage construct. In certain embodiments, additional user input indicating modifications to the data set can be received. Additional user input indicating modifications to the data set can be received through the data entry user interface included as part of the defined data collection construct. In various embodiments, the data collection construct, the data storage construct, and the queries are updated based on the additional user input indicating modifications to the data set.

FIG. 1 illustrates an example environment 100 for entering data. The example environment 100 includes a repository datastore 102. In some embodiments, the repository datastore 102 comprises a central repository datastore configured to store data in a centralized location. In some embodiments, the repository datastore 102 may comprise one or more non-central repositories (e.g., distributed repositories) instead of, or in addition to, a central repository. The one or more non-central repositories may be configured to store data in one or more non-centralized locations. This may allow, for example, different entities having different requirements for permissions to share the system for data entry/collection without sharing a data storage construct. Additionally, this may allow users to independently scale out the data storage construct for high data availability without affecting other aspects of the system. It will be appreciated that reference to a central repository. For example, the repository datastore 102 can store data for an enterprise in a centralized location. Further, the repository datastore 102 can store data in a location remote from a source of the data. For example, the repository datastore 102 can be implemented as a cloud-based datastore configured to store data remote from an enterprise system that generates the data.

As shown in FIG. 1, the example environment 100 also includes a customizable data entry system 104. The example environment 100 can include one or more processors and memory. The one or more processors and memory of the example environment 100 can be included as part of the customizable data entry system 104. The processors can be configured to perform various operations of the customizable data entry system 104 by interpreting machine-readable instructions. The customizable data entry system 104 can be implemented through, at least in part, or otherwise accessed through a graphical user interface presented to a user. In various embodiments, the customizable data entry system 104 can be implemented through, at least in part, a graphical user interface presented to a user as part of a data entry user interface.

In various embodiments, the customizable data entry system 104 is configured to store and retrieve data stored in the repository datastore 102. The customizable data entry system 104 can store and retrieve data stored in the repository datastore 102 through one or an applicable combination of a local area network, a wide area network, an enterprise network, and a local device. In various embodiments, the customizable data entry system 104 can store and retrieve data stored in the repository 102 that is entered through the customizable data entry system 104 by a user. More specifically, the customizable data entry system 104 can store and retrieve all or portions of data in a data set that is input through the customizable data entry system 104 and stored in the repository 102 by the customizable data entry system 104. In various embodiments, the customizable data entry system 104 can send all or portions of a data set stored locally on a system or part of a network on which the customizable data entry system 104 is implemented to the repository 102, for use in storing all or portions of a data set at the repository 102.

In various embodiments, the customizable data entry system 104 can present or cause presentation of a data entry graphical user interface, hereinafter referred to as a data entry user interface, to a user for use in inputting data by the user. The customizable data entry system 104 can generate a data entry user interface based on input received from a user as part of a data collection construct. Additionally, the customizable data entry system 104 can modify an already created data entry user interface based on input received from a user as part of modifying the data collection construct according to the user input. In some embodiments, the customizable data entry system 104 can automatically generate and/or update the data entry user interface (e.g., when the user defines a data set). The data entry user interface can be compatible with different types of front end systems.

As shown in FIG. 1, in some embodiments, the customizable data entry system 104 can include a data collection construct management engine 106, a data storage construct management engine 108, a repository storage engine 112, and a datastore 110. The data collection construct management engine 106, the data storage construct management engine 108, and the repository storage engine 112 can be executed by the processor(s) of the customizable data entry system 104 to perform various operations including those described in reference to the data collection construct management engine 106, the data storage construct management engine 108, and the repository storage engine 112.

In various embodiments, the data collection construct management engine 106 is configured to define a data collection construct for use in collecting data in a data set from a user. In defining, a data collection construct for use in collecting data in a data set, the data collection construct management engine 106 can generate and update a data collecting construct. For example, the data collection construct management engine 106 can modify an already created data collection construct. A data collection construct can include a type of data in a data set to collect, a format in which to collect data in a data set, needed fields for collecting data, rules associated with collecting the data through a data collection construct, and a data entry user interface for use in collecting data in a data set. For example, a data collection construct created by the data collection construct management engine 106 can include a data entry user interface with fields a user can populate based on a data type defined for the fields. In another example, the data collection construct management engine 106 can modify a data collection construct by adding a field to a form as part of a data entry user interface. In yet another example, a data collection construct created by the data collection construct management engine 106 can include validation constraints for validating data entered through the data collection construct.

In various embodiments, the data collection construct management engine 106 is configured to define a data collection construct based on user input. In defining a data collection construct based on user input, the data collection construct management engine 106 can generate a new data collection construct for use in collecting data based on the user input. For example, the data collection construct management engine 106 can generate a data entry user interface of a specific format for collecting data of a specific type, as indicated by user input indicating the format in which to collect the specific type of data. Further, in defining a data collection construct based on user input, the data collection construct management engine 106 can modify an already created data collection construct for use in collecting data based on the user input. For example, the data collection construct management engine 106 can change a format of a data entry user interface of an already created data collection construct based on user input specifying a new format.

In various embodiments, the data collection construct management engine 106 is configured to use a previously defined data collection construct to define a data collection construct. For example, the data collection construct management engine 106 can use a form of a previously defined data collection construct to define a new data collection construct. In using a previously defined data collection construct to define a data collection construct, the data collection construct management engine 106 can group, chain, or nest the defined data collection construct with the previously defined data collection construct. For example, the data collection construct management engine 106 can associate a data collection construct used in collecting data for a specific organization with a previously defined data collection construct for the organization. In another example, the data collection construct management engine 106 can nest a data collection construct with a previously defined data collection construct to cause data entered to the data collection to also be entered in the previously defined data collection construct after being entered through the data collection construct.

In various embodiments, the data collection construct management engine 106 is configured to analyze data at the data collection construct as it is entered through the data collection construct. In analyzing data at the data collection construct as it is entered through the data collection construct, the data collection construct management engine 106 can validate the data at the data collection construct. For example, if validation constraints specify data entered into a field can only include numbers, then the data collection construct management engine 106 can validate data entered into the field to ensure the entered data does not include letters.

In various embodiments, the data collection construct management engine 106 is configured to present or cause presentation of a data entry user interface to a user for purposes of providing functionalities to the user for entering data through the interface. The data collection construct management engine 106 can present a data entry user interface to a user as defined by a data collection construct. For example, if a defined data collection construct specifies to present a data entry user interface including a graph node, then the data collection construct management engine 106 can present a data entry user interface including the graph node to a user. In another example, if a data collection construct is modified to change a user interface from including a graph node to a table row, then the data collection construct management engine 106 can modify a data entry user interface from presenting the graph node to the table row.

In various embodiments, the data storage construct management engine 108 is configured to define a data storage construct. A data storage construct created by the data storage construct management engine 108 can include either or both table schema and index mappings for storing data through the data storage construct. Additionally, a data storage construct created by the data storage construct management engine 108 can include queries for use in retrieving data stored according to the data storage construct. For example, a data storage construct created by the data storage construct management engine 108 can include queries for use in presenting to a user data entered into fields as the user enters the data into the fields. The data storage construct management engine 108 can define a data storage construct for use in storing data entered through a data collection construct defined by the data collection construct management engine. Additionally, the data storage construct management engine 108 can define a data storage construct for use in storing data at the datastore 110.

In various embodiments, the datastore 110 can be implemented locally with respect to the customizable data entry system 104. For example, the datastore 110 can be implemented on a device used to present a data entry user interface to a user in the operation of the customizable data entry system 104. In another example, the datastore 110 can be implemented within a local area network or an enterprise network of a user entering data through the customizable data system 104.

In various embodiments, the data storage construct management engine 108 is configured to define a data storage construct specifically associated with a data collection construct. In being associated with a data collection construct, a data storage construct can be used to store data entered through the data collection construct. For example, the data storage construct management engine 108 can define a new data storage construct associated with a data collection construct. In another example, the data storage construct management engine 108 can associate an already created data storage construct with a data collection construct when the data collection construct is created. A data storage construct defined by the data storage construct management engine 108 can be associated with a plurality of data collection constructs. For example, a data storage construct defined by the data storage construct management engine 108 can be associated with data collection constructs with data entry user interfaces configured to collect data of a specific type. In some embodiments, a data collection construct can be associated with a plurality of data storage constructs. This may, for example, be helpful as different datastores are optimized for varying performance gain (e.g., search, availability, batch entry, and/or the like).

In various embodiments, the data storage construct management engine 108 can automatically define a data storage construct for a data collection construct. In automatically defining a data storage construct for a data collection construct, the data storage construct management engine 108 can automatically define the data storage construct for the data collection construct absent user input specifying how to define the data storage construct. Additionally, in automatically defining a data storage construct for a data collection construct, the data storage construct management engine 108 can define a data storage construct absent input from a developer. In defining a data storage construct for a data collection construct, the data storage construct management engine 108 can automatically define a data storage construct based on received user input defining the data collection construct. For example, if a data collection construct is defined to collect a specific type of data based on user input, then the data storage construct management engine 108 can define a data storage construct for the data collection construct based on the specific type of data. In another example, if a data collection construct is defined to collect data using a specific format of a data entry user interface, then the data storage construct management engine 108 can define a data storage construct for storing data input through the specific format of data entry.

In various embodiments, the data storage construct management engine 108 is configured to automatically define a data storage construct based on data storage construct definition rules. Data storage construct definition rules include applicable rules for defining a data storage construct without specific instructions from a user regarding defining a data storage construct. For example, data storage construct definition rules can indicate one or a combination of table schema, index mappings, and queries to use in defining a data storage construct. Data storage construct definition rules can be specific to aspects of collecting data. For example, data storage construction rules can be specific to a data type of data collected using a data collection construction. In another example, data storage construction rules can be specific to a form used in collecting data using a data collection construct.

In various embodiments, the data storage construct management engine 108 is configured to analyze data entered through a defined data collection construct and stored according to a defined data storage construct. In analyzing data entered through a defined data collection construct and stored according to a defined data storage construct, the data storage construct management engine 108 can either or both collect granular metrics of the data and gather analytics of incremental data of the data. For example, the data storage construct management engine 108 can analyze data input through a data collection construct and stored according to a defined data storage construct to determine average values of the data input into certain fields. In another example, the data storage construct management engine 108 can analyze data input through a data collection construct and stored according to a define data storage construct to determine changes to the data over time.

In various embodiments, the data storage construct management engine 108 is configured to validate data stored according to a data storage construct. More specifically, the data storage construct management engine 108 can validate data stored in the datastore 110 according to a data storage construct. For example, the data storage construct management engine 108 can determine whether data stored according to a data storage construct improperly includes null values. In validating data stored according to a data storage construct, the data storage construct management engine 108 can validate the data according to data validation constraints. For example, if data validation constraints specify that data cannot be greater than three symbols, then the data storage construct management engine 108 can validate data to check whether data stored according to a data storage construct at the datastore 110 is greater than three symbols.

In some embodiments, the data storage construct management engine 108 is configured to migrate (e.g., transform) data stored based on changes to the data collection construct. Manual user intervention when it comes to migration may be permissible (e.g., for safety and correctness).

In various embodiments, the repository storage engine 112 is configured to control transfer of data to the centralized datastore 102. The repository storage engine 112 can control transfer of data collected according to a data collection construct to the centralized datastore 102. Additionally, the repository storage engine 112 can control transfer of data stored in a datastore according to a data storage construct to the centralized datastore 102. The repository storage engine 112 can control transfer of data collected according to a data collection construct defined by the data collection construct management engine 106. Further, the repository storage engine 112 can control transfer of data stored in the datastore 110 according to a data storage construct defined by the data storage construct management engine 108. In controlling transfer of data, the repository storage engine 112 can select specific data to transfer and subsequently transfer that data to the repository 102.

In various embodiments, the repository storage engine 112 is configured to transfer data to the repository 102 according to either or both a data collection construct and a data storage construct. More specifically, the repository storage engine 112 can transfer data to the repository 102 based on one or a combination of a data type of data entered, a time at which data is entered, and a user who entered data. For example, the repository storage engine 112 can extract only data that has been updated in the last day, and subsequently transfer the data from the datastore 110 to the repository 102. In another example, the repository storage engine 112 can extract data of a specific type that has been entered, and subsequently transfer the data from the datastore 110 to the repository 102.

Figure 2:
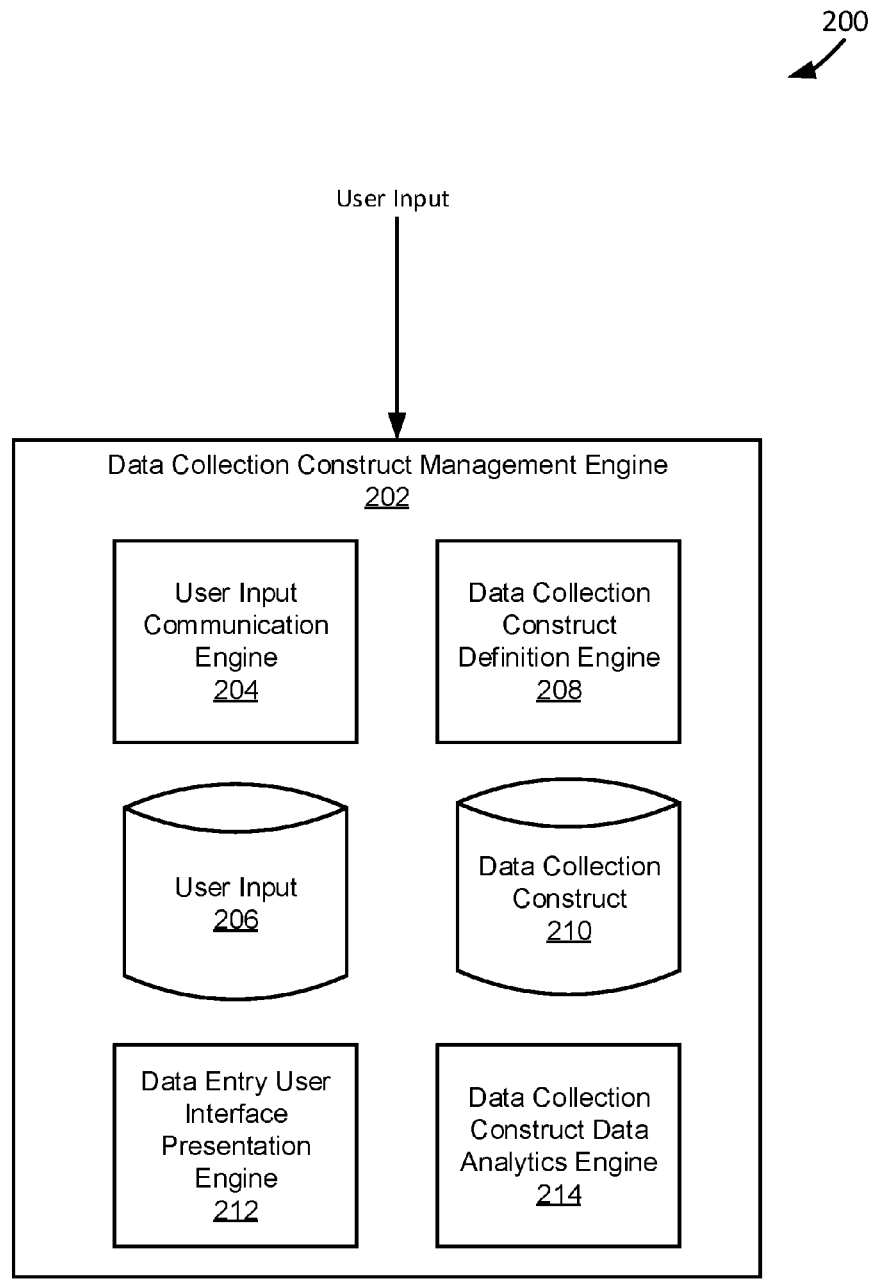
FIG. 2 illustrates an example environment for defining a data collection construct, in accordance with various embodiments.

FIG. 2 illustrates an example environment 200 for defining a data collection construct. As shown in FIG. 2, the example environment 200 includes a data collection construct management engine 202. The example environment 200 can include one or more processors and memory. The one or more processors and memory of the example environment 200 can be included as part of the data collection construct management engine 202. The processors can be configured to perform various operations of the data collection construct management engine 202 by interpreting machine-readable instructions. The data collection construct management engine 202 can be implemented through, at least in part, or otherwise accessed through a graphical user interface presented to a user.

In various embodiments, the data collection construct management engine 202 is configured to receive user input for use in defining a data collection construct. The data collection construct management engine 202 can receive user input to define a new data collection construct. For example, the data collection construct management engine 202 can receive user input defining a form of a data entry user interface to use in collecting data through a data collection construct. Additionally, the data collection construct management engine 202 can receive user input to modify an already existing data collection construct. For example, the data collection construct management engine 202 can receive user input indicating an added field to a data entry user interface to use in collecting data through a data collection construct.

As shown in FIG. 2, in some embodiments, the data collection construct management engine 202 can include a user input communication engine 204, a user input datastore 206, a data collection construct definition engine 208, a data collection construct datastore 210, a data entry user interface presentation engine 212, and a data collection construct data analytics engine 214. The user input communication engine 204, the data collection construct definition engine 208, the data entry user interface presentation engine 212, and the data collection construct data analytics engine 214 can be executed by the processor(s) of the data collection construct management engine 202 to perform various operations including those described in reference to the user input communication engine 204, the data collection construct definition engine 208, the data entry user interface presentation engine 212, and the data collection construct data analytics engine 214.

In various embodiments, the user input communication engine 204 is configured to receive user input regarding data entry. The user input communication engine 204 can receive user input regarding a data collection construct. For example, the user input communication engine 204 can receive user input indicating a form in which to collect data through a data entry user interface. The user input communication engine 204 can receive user input indicating changes to make to an already defined data collection construct. For example, the user input communication engine 204 can receive user input indicating to remove a field from a data entry user interface as part of a data collection construct. The user input communication engine 204 can store received user input related to a data collection construct in the user input datastore 206.

In various embodiments, the data collection construct definition engine 208 is configured to define a data collection construct for use in collecting data. The data collection construct definition engine 208 can define a data collection construct based on user input stored in the user input datastore 206 and received by the user input communication engine 204. For example, if user input indicates a data entry user interface should be in a table format, then the data collection construct definition engine 208 can define a data collection construct to include a data entry user interface including a table. The data collection construct definition engine 208 can define a data collection construct to indicate a type of data in a data set to collect, a format in which to collect data in a data set, needed fields for collecting data, rules associated with collecting the data through a data collection construct, and a data entry user interface for use in collecting data in a data set.

In various embodiments, the data collection construct definition engine 208 is configured to define a data collection construct using an already existing data collection construct. More specifically, the data collection construct definition engine 208 can use computer executable instructions defining an already existing data collection construct to define a new data collection construct. For example, the data collection construct definition engine 208 can create a data collection construct using computer executable instructions for a data entry user interface in a previously defined data collection construct. The data collection construct definition engine 208 can use a previously created data collection construct to define a new data collection construct based on one or a combination of a data type, an enterprise associated with a user, and a specific user. For example, the data collection construct definition engine 208 can create a data collection construct for a user associated with an enterprise using a previously defined data collection construct for the enterprise.

In various embodiments, the data collection construct definition engine 208 is configured to modify an already existing data construct. The data collection construct definition engine 208 can modify an already existing data construct based on user input stored in the user input datastore 206 and received by the user input communication engine 204. For example, if user input indicates to change a form of a data collection construct from a graph node format to a table row format, then the data collection construct definition engine 208 can modify the data collection construct to include a data entry user interface in the table row format. The graph node format may indicate relationships between entries in a data collection construct. Accordingly, entries of a data storage construct do not necessarily have to stem from the same data set. In another example, if user input indicates adding a field to a data collection construct, then the data collection construct definition engine 208 can change the data collection construct to include the field.

In various embodiments, the data collection construct definition engine 208 is configured to generate and update data collection construct data stored in the data collection construct datastore 210 to indicate a defined data collection construct. For example, the data collection construct definition engine 208 can generate data collection construct data stored in the data collection construct datastore 210 to indicate a newly defined data collection construct. In another example, the data collection construct definition engine 208 can modify data collection construct data stored in the data collection construct datastore 210 to indicate changes made to a data collection construct.

In various embodiments, the data collection construct definition engine 208 can group, chain, or nest the defined data collection construct with the previously defined data collection construct. For example, the data collection construct definition engine 208 can associate a data collection construct used in collecting data for a specific company with a previously defined data collection construct for the company. In another example, the data collection construct definition engine 208 can nest a data collection construct defined for a user into a previously defined data collection construct defined for the user.

In various embodiments, the data entry user interface presentation engine 212 is configured to present a data entry user interface of a defined data collection construct to a user for purposes of receiving data entered through the user interface by a user. The data entry user interface presentation engine 212 can use data collection construct data of a defined data collection construct stored in the data collection construct datastore 210 to present a data entry user interface to a user. For example, if data collection construct data of a defined data collection construct indicates presenting a user interface in a graph node form, then the data entry user interface presentation engine 212 can present an interface in graph node form to a user. The data entry user interface presentation engine 212 can modify a data entry user interface to a user based on modifications made to a data collection construct. For example, if a data collection construct is modified to remove a field, then the data entry user interface presentation engine 212 can modify a data entry user interface presented to a user by removing the field from the interface.

In various embodiments, the data collection construct data analytics engine 214 is configured to perform analytics on data entered through a data collection construct. The data collection construct data analytics engine 214 can perform analytics on data as it is entered through a data collection construct. More specifically, the data collection construct data analytics engine 214 can validate data as it is entered through a data collection construct according to validation constraints. For example, if validation constraints indicate data must be at least three characters long and a user enters data that is only two characters long, then the data collection construct data analytics engine 214 can provide a notification to a user, through a data entry user interface, indicating that the user has entered invalid data.

In some embodiments, the data collection construct data analytics engine 214 is configured to cooperate with one or more services (e.g., an event service). This may allow, for example, services to listen for changes in the datastore and behave/react accordingly. For example, if a new entry is added to a user defined dataset, another service can listen for new entries to the data set and perform search and/or aggregations on behalf of the user.

Figure 3:
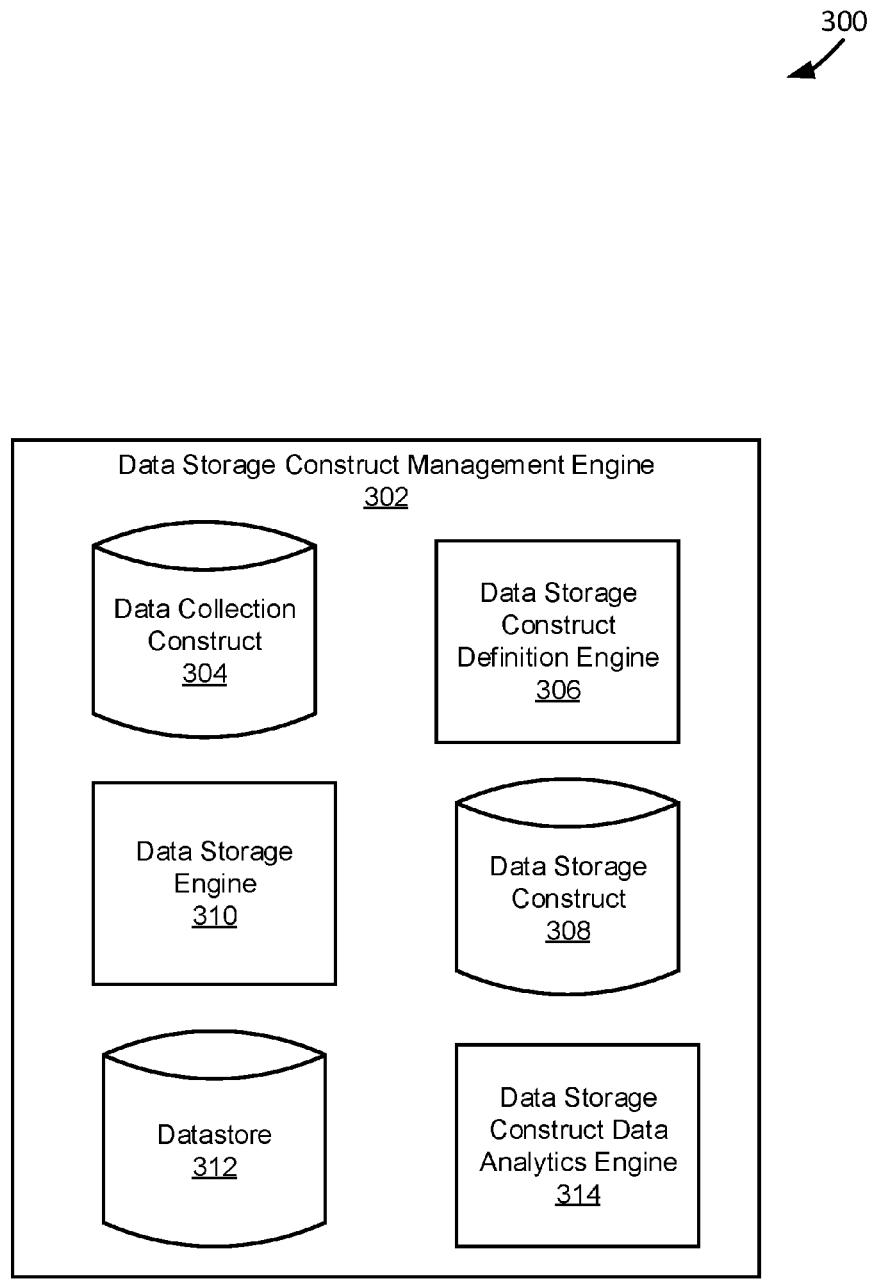
FIG. 3 illustrates an example environment for defining a data storage construct, in accordance with various embodiments.

FIG. 3 illustrates an example environment 300 for defining a data storage construct. As shown in FIG. 3, the example environment 300 includes a data storage construct management engine 302. The example environment 300 can include one or more processors and memory. The one or more processors and memory of the example environment 300 can be included as part of the data storage construct management engine 302. The processors can be configured to perform various operations of the data storage construct management engine 302 by interpreting machine-readable instructions. The data storage construct management engine 302 can be implemented through, at least in part, or otherwise accessed through a graphical user interface presented to a user.

In various embodiments, the data storage construct management engine 302 is configured to define a data storage construct for use in storing data entered through a data collection construct. The data storage construct management engine 302 can automatically define a data storage construct based on a data collection construct defined according to user input. For example, in defining a data storage construct, the data storage construct management engine 302 can define table schema and index mappings based on a defined data collection construct. In another example, in defining a data storage construct, the data storage construct management engine 302 can define queries for use in retrieved data stored according to the data storage construct based on a defined data collection construct.

As shown in FIG. 3, in some embodiments, the data storage construct management engine 302 can include a data collection construct datastore 304, a data storage construct definition engine 306, a data storage construct datastore 308, a data storage engine 310, a datastore 312, and a data storage construct data analytics engine 314. The data storage construct definition engine 306, the data storage engine 310, and the data storage construct data analytics engine 314 can be executed by the processor(s) of the data storage construct management engine 302 to perform various operations including those described in reference to the data storage construct definition engine 306, the data storage engine 310, and the data storage construct data analytics engine 314.

In various embodiments, the data collection construct datastore 304 is configured to store data collection construct data indicating a defined data collection construct. A data collection construct indicated by data collection construct data stored in the data collection construct datastore 304 can be maintained by an applicable engine for defining a data collection construct, such as the data collection construct management engines described in this paper. Data collection construct data stored in the data collection construct datastore 304 can include a type of data in a data set to collect, a format in which to collect data in a data set, needed fields for collecting data, rules associated with collecting the data through a data collection construct, and a data entry user interface for use in collecting data in a data set. Data collection construct data stored in the data collection construct datastore 304 can be modified based on user input. For example, data collection construct data stored in the data collection construct datastore 304 can be updated to indicate changes made to a defined data collection construct based on user input.

In various embodiments, the data storage construct definition engine 306 is configured to define a data storage construct for use in storing data entered through a data collection construct. The data storage construct definition engine 306 can define a data storage construct automatically for a data collection construct based on the data collection construct. More specifically, the data storage construct definition engine 306 can automatically define a data storage construct for a data collection construct absent user input indicating how to define the data storage construct. For example, the data storage construct definition engine 306 can define a data storage construct based on a data type a data collection construct is defined to collect. The data storage construct definition engine 306 can generate and update data storage construct data stored in the data storage construct datastore 308 to indicate a defined data storage construct.

In various embodiments, the data storage construct definition engine 306 can define either or both table schema and index mappings in defining a data storage construct. Additionally, the data storage construct definition engine 306 can define queries, as included as part of a data storage construct, for use in retrieving data stored according to the data storage construct. For example, the data storage construct definition engine 306 can define queries for use in retrieving specific portions of data stored according to a data storage construct.

In various embodiments, the data storage construct definition engine 306 is configured to define a data storage construct according to data storage construct definition rules. Data storage construct definition rules can be specific to one or a combination of a data type collected according to a data collection construct, a user who created a data collection construct, a user who is utilizing a data collection construct to enter data, and an entity or enterprise associated with a data collection construct. For example, data storage construct definition rules can be unique to a company with employees using a data collection construct to enter data.

In various embodiments, the data storage construct definition engine 306 is configured to define a data storage construct based on already created data storage constructs. For example, the data storage construct definition engine 306 can use an already created data storage construct for storing a specific type of data to create a new data storage construct for storing the specific type of data. In another example, the data storage construct definition engine 306 can use an already created data storage construct created for a user to define a new data storage construct for the user. In some embodiments, other users may also leverage existing data storage constructs regardless of who the original owner/creator was (e.g., depending on permissions).

In various embodiments, the data storage engine 310 is configured to store data in the datastore 312 according to a data storage construct indicated by data storage construct data stored in the data storage construct datastore 308. For example, the data storage engine 310 can store data in the datastore 312 according to index mappings defined as part of a data storage construct. The data storage engine 310 can store data entered through a data collection construct associated with a data storage construct. For example, if a data storage construct is defined for a data collection construct, then the data storage engine 310 can store data entered through the data collection construct using the data storage construct.

In various embodiments, the data storage engine 310 is configured to retrieve data from the datastore 312. The data storage engine 310 can retrieve data from the datastore 312 using a data storage construct used to store the data in the datastore 312. For example, the data storage engine 310 can use queries included as part of a data storage construct to retrieve and/or otherwise obtain data stored in the datastore 312 using the data storage construct. For example, the data storage engine 310 can fetch specific records, find records that a user did not know existed, and/or finding related records to keywords (e.g., keywords manually entered by a user). As used herein, a record is equivalent to a data entity that is entered in a data collection construct.

In various embodiments, the data storage engine 310 is configured to modify a data storage construct based on modifications made to a data collection construct associated with the data storage construct. In modifying a data storage construct based on modifications made to a data collection construct, the data storage engine 310 can modify one or a combination of a table schema, index mappings, and queries of the data storage construct. For example, if a user modifies a data collection construct to include an additionally data entry field, then the data storage engine 310 can modify an index mapping of a data storage construct to allow for storage data entered through the additional data entry field.

In various embodiments, the data storage construct data analytics engine 314 is configured to perform analytics of data stored in the datastore 312 according to a data storage construct. The data storage construct data analytics engine 314 can either or both collect granular metrics of the data and gather analytics of incremental data of the data. For example, the data storage construct data analytics engine 314 can determine a number of null values in a data set. Further, the data storage construct data analytics engine 314 can analyze the data at a storage construct level by analyzing the data as it is stored in the local datastore 312 according to the data storage construct. More specifically, the data storage construct data analytics engine 314 can analyze data stored in datastore 312 before it is transferred to a repository, e.g. a remote system.

In various embodiments, the data storage construct data analytics engine 314 is configured to validate data stored in the datastore 312. The data storage construct data analytics engine 314 can validate data at a data storage construct level, e.g. as it is stored in the datastore 312 and before it is transferred to a repository. In some embodiments, validation may also occur before the data enters the datastore using the user interface that the client uses to enter data. Custom validation schemes (or, user-defined validation schemes) may be implemented. Custom validation schemes may define, for example, when and/or how validation occurs. The data storage construct data analytics engine 314 can validate data stored in the datastore 312 according to validation constraints. For example, if validation constraints specify a field cannot have a null value, then the data storage construct data analytics engine 314 can validate data to ensure the field does not have a null value. The data storage construct data analytics engine 314 can provide a notification to a user, through a data entry user interface, indicating entered data is invalid if the data storage construct data analytics engine 314 determines the entered data is invalid.

Figure 4:
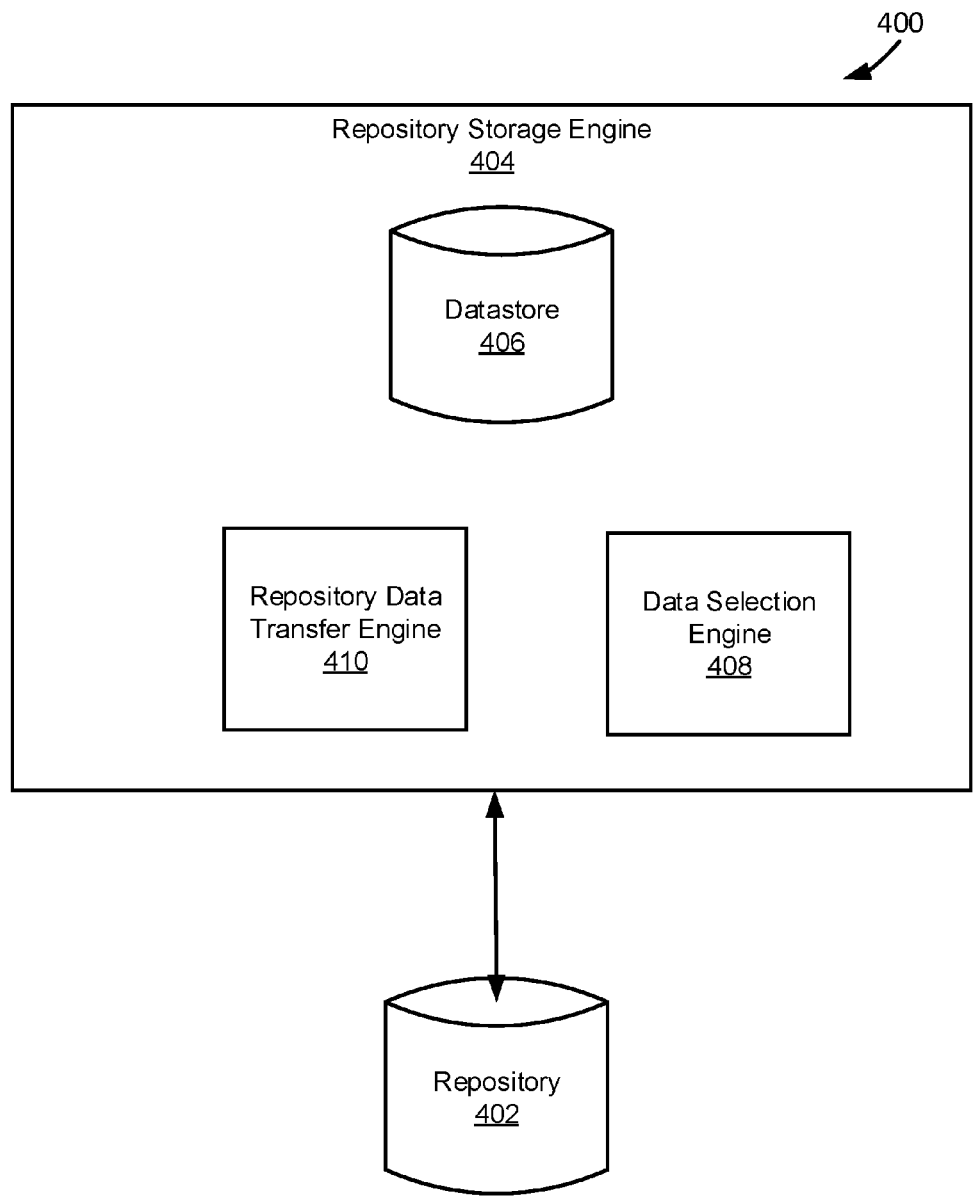
FIG. 4 illustrates an example environment for selectively transferring data to a repository, in accordance with various embodiments.

FIG. 4 illustrates an example environment 400 for selectively transferring data to a repository. As shown in FIG. 4, the example environment 400 includes a repository 402. The repository 402 can be implemented at a remote location. For example, the repository 402 can be implemented in the cloud. Additionally, the repository 402 can be specific to one or a plurality of entities or enterprises. For example, the repository 402 can be a remote data storage system of a company.

As shown in FIG. 4, the example environment 400 includes a repository storage engine 402. The example environment 400 can include one or more processors and memory. The one or more processors and memory of the example environment 400 can be included as part of the repository storage engine 402. The processors can be configured to perform various operations of the repository storage engine 402 by interpreting machine-readable instructions.

In various embodiments, the repository storage engine 404 is configured to selectively transfer stored data to the repository 402. The repository storage engine 404 can selectively transfer data entered through a data collection construct defined based on user input. Additionally, the repository storage engine 404 can selectively transfer data stored according to a data storage construct automatically created based on a data collection construct.

As shown in FIG. 4, in some embodiments, the repository storage engine 404 can include a datastore 406, a data selection engine 408, and a repository data transfer engine 410. The data selection engine 408 and the repository data transfer engine 410 can be executed by the processor(s) of the repository storage engine 404 to perform various operations including those described in reference to the data selection engine 408 and the repository data transfer engine 410.

In various embodiments, the datastore 406 is configured to store data of a data set capable of being transferred to the repository 402. Data stored in the datastore 406 can be entered through a data collection construct defined based on user input. Additionally, data stored in the datastore 406 can be stored according to a data storage construct automatically defined based on a data collection construct.

In various embodiments, the data selection engine 408 is configured to select data stored in the datastore 406 to transfer to the repository 402. The data selection engine 408 can select data to transfer to the repository 402 based on one or a combination of a data type of the data, a user who entered the data, and a time when the data was entered or modified. For example, the data selection engine 408 can select data to transfer to the repository 402 once the data is created or updated. The data selection engine 408 can select data to transfer to the repository based on data size. More specifically, the data selection engine 408 can select up to a specific amount of data to transfer to the repository 402. For example, the data selection engine 408 can select 100 Gb of data stored in the datastore 406 to transfer to the repository 402. The rate of transfer can be a function of resource constraints and/or client requirements. For example, if the environment 400 is under stress, the amount of data transferred back to the repository 402 at any given time can be low (e.g., in order to not add stress to the other system(s) in the environment 400). If the client requirements are to have strong consistency guarantees between the data in the engine 404 and the repository 402, then the transfer of data may be continuous and the resource demands of the engine 404 may be greater.

In various embodiments, the data selection engine 408 is configured to perform auditing functionality. The auditing functionality may be toggled on/off. The auditing functionality can provide a fine grain list of every instance that data has been inserted, updated and/or deleted can be chronicled. The resulting audit log can also be sent to the repository 402 for storage.

In various embodiments, the repository data transfer engine 410 is configured to transfer data stored in the datastore 406 to the repository. The repository data transfer engine 410 can transfer data selected by the data selection engine 408. For example, the repository data transfer engine 410 can transfer a subset of data selected by the data selection engine 408 based on the subset of the data being updated by a user. The repository data transfer engine 410 can transfer data to the repository 402 at scheduled times. For example, the repository data transfer engine 410 can transfer data to the repository 402 every day at the same time.

Figure 5:
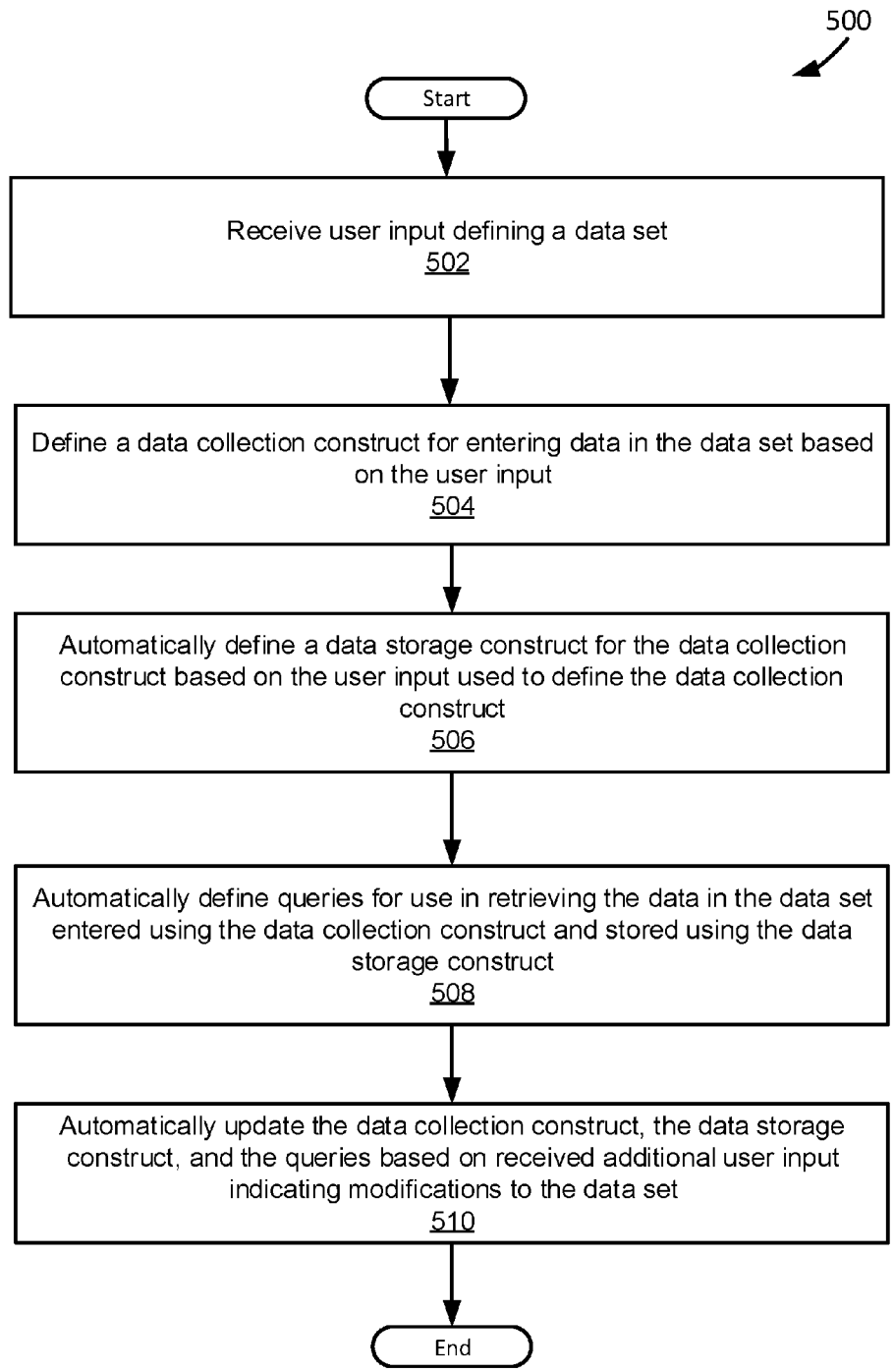
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, user input defining a data set is received. An applicable engine for receiving user input, such as the user input communication engines described in this paper, can receive user input defining a data set. User input received at block 502 can include applicable information describing a desired way in which to collect data. For example, user input received at block 502 can indicate fields a data entry user interface should have for gathering data in the data set.

At block 504, a data collection construct for entering data is defined based on the user input. An applicable engine for defining a data collection construct, such as the data collection construct definition engines described in this paper, can define a data collection construct for entering data based on the user input. A defined data collection construct can include a defined data entry user interface for use by the user in inputting data in the data set.

At block 506, a data storage construct for the data collection construct is defined based on the user input used to define the data collection construct. An applicable engine for defining a data storage construct, such as the data storage construct definition engines described in this paper, can automatically define a data storage construct for the data collection construct based on the user input. A data storage construct can be automatically defined based on the data collection construct without receiving explicit input defining the data storage construct from the user. Additionally, a data storage construct can be automatically defined using previously defined data storage constructs.

At block 508, queries for use in retrieving the data in the data set entered through the data collection construct and stored using the data storage construct are automatically defined. An applicable engine for defining a data storage construct, such as the data storage construct definition engines described in this paper, can define queries for use in retrieving the data in the data set entered through the data collection construct and stored using the data storage construct. Queries for retrieving the data in the data set can be included as part of the defined data storage construct.

At block 510, the data collection construct, the data storage construct, and the queries are automatically updated based on received additional user input indicating modifications to the data set. An applicable engine for defining a data collection construct, such as the data collection construct definition engines described in this paper, can automatically update the data collection construct based on received additional user input indicating modifications to the data set. An applicable engine for defining a data storage construct, such as the data storage construct definition engines described in this paper, can automatically update the data storage construct and the queries based on received additional user input indicating modifications to the data set.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
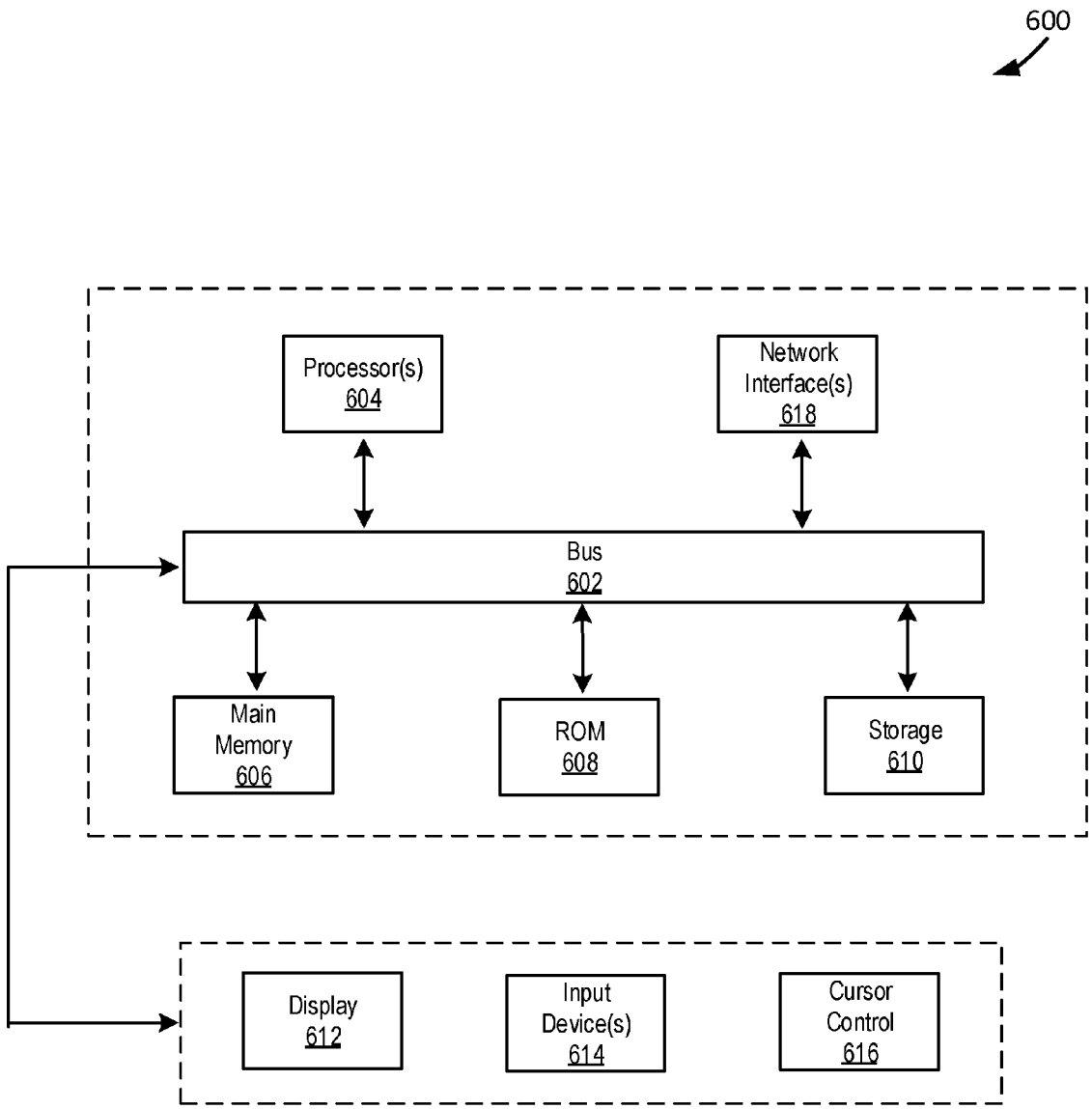
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for controlling data entry comprising:
one or more processors and a memory storing instructions that, when executed by the one or more processors, cause the system to:
receive user input from a user defining a data set;
define a data collection construct including a data entry user interface based on the user input for use in inputting data in the data set;
automatically define, according to the defined data collection construct, a schema or index mappings to generate queries in retrieving data from a data storage construct that stores data collected through the data collection construct;
add a field to or remove a field from the data collection construct;
nest the data collection construct having the added or removed field into a previously defined data collection construct so that a corresponding field is added or removed from the previously defined data collection construct; and
apply the schema or the index mappings to the data storage construct.

2. The system of claim 1, wherein the system is further caused to:
define the queries used to retrieve a portion of the data stored in the data storage construct based on the defined data collection construct.

3. The system of claim 1, wherein the data collection construct is defined to include a type of data in the dataset; and the data storage construct is automatically defined based on the type of data and a format to collect data in the dataset.

4. The system of claim 1, wherein the system is further caused to:
determine whether data stored according to the data storage construct improperly includes null values.

5. The system of claim 1, wherein the system is further caused to:
automatically modify the defined schema of the data storage construct based on the modified format of the data collection construct.

6. The system of claim 1, wherein the system is further caused to:
   add or remove a field to the data collection construct; and
   nest the data collection construct having the added or removed field into the previously defined data collection construct so that a corresponding field is added or removed from the previously defined data collection construct.

7. The system of claim 1, wherein the system is further caused to:
   automatically modify the index mappings of the data storage construct based on the added or removed field of the data collection construct.

8. The system of claim 1, wherein the system is further caused to:
   control a rate of data transfer from the datastore to a repository based on a resource constraint or stress associated with the data transfer and a required consistency level between the datastore and the repository.

9. A method implemented by a computing system including one or more physical processors and storage media storing machine-readable instructions, the method comprising:
   receiving user input from a user defining a data set;
   defining a data collection construct including:
      a data entry user interface based on the user input for use in inputting data in the data set, and
      a format, one or more fields, and one or more rules to collect data in the data set;
   automatically defining, according to the defined data collection construct, a schema or index mappings to generate queries in retrieving data from a data storage construct that stores data collected through the data collection construct;
   adding a field to the data collection construct;
   nesting the data collection construct having the added field into a previously defined data collection construct so that a corresponding field is added from the previously defined data collection construct; and
   applying the schema or the index mappings to the data storage construct.

10. The method of claim 9, further comprising:
    defining the queries used to retrieve a portion of the data stored in the data storage construct based on the defined data collection construct.

11. The method of claim 9, further comprising:
    determining whether data stored according to the data storage construct improperly includes null values.

12. A non-transitory computer readable medium comprising instructions that, when executed, cause one or more processors to perform:
    receiving user input from a user defining a data set;
    defining a data collection construct including:
       a data entry user interface based on the user input for use in inputting data in the data set, and a format to collect data in the data set;
    automatically defining, according to the defined data collection construct, a schema or index mappings to generate queries in retrieving data from a data storage construct that stores data collected through the data collection construct;
    modifying the format of the data collection construct;
    nesting the modified data collection construct into a previously defined data collection construct so that a same modification is made to the previously defined data collection construct; and
    applying the schema or the and index mappings to the data storage construct.

13. The non-transitory computer readable medium of claim 12, wherein the instructions further cause the one or more processors to perform:
    defining the queries used to retrieve a portion of the data stored in the data storage construct based on the defined data collection construct.

14. The non-transitory computer readable medium of claim 12, wherein the instructions further cause the one or more processors to perform:
    determining whether data stored according to the data storage construct improperly includes null values.

* * * * *